Sept. 3, 1940.   W. A. DUNDAS ET AL   2,213,667
METHOD OF AND APPARATUS FOR DISPOSING OF SEWAGE WASTE
Original Filed Aug. 26, 1933
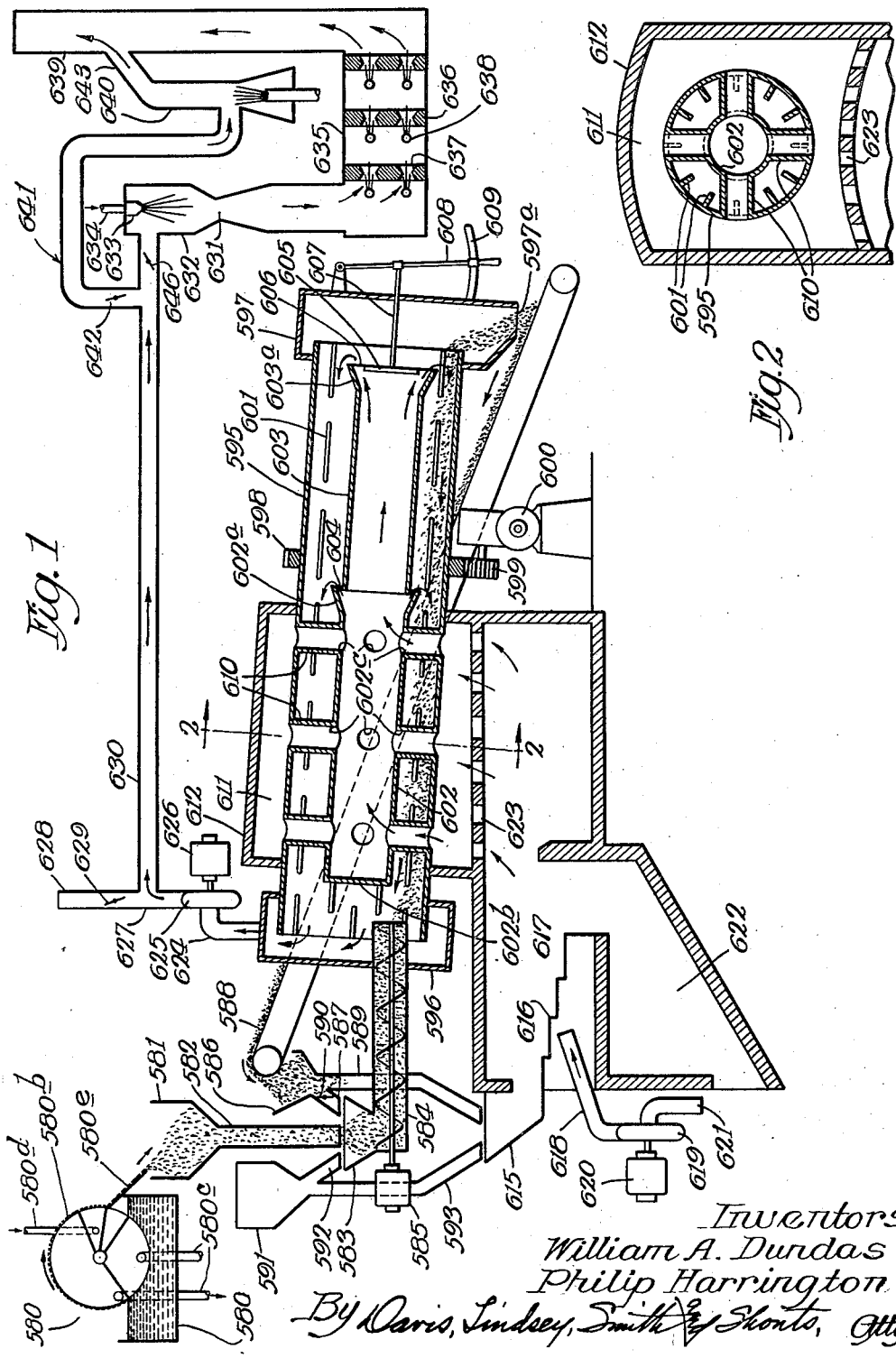
Inventors:
William A. Dundas
Philip Harrington
By Davis, Lindsey, Smith & Shonts, Attys.

Patented Sept. 3, 1940

2,213,667

UNITED STATES PATENT OFFICE 2,213,667

METHOD OF AND APPARATUS FOR DISPOSING OF SEWAGE WASTE

William A. Dundas, Winnetka, and Philip Harrington, Chicago, Ill.

Original application August 26, 1933, Serial No. 686,926. Divided and this application October 22, 1937, Serial No. 170,464

5 Claims. (Cl. 110—14)

This invention relates to improvements in methods of and apparatus for the disposal of sewage wastes and the like and its purpose is to provide means for accomplishing this object more efficiently and more economically than has heretofore been possible by the methods commonly in use. Although particularly adapted for the treatment of sewage waste, the invention may be employed for the disposal of garbage, rubbish, and other municipal or other wastes or the like, or mixtures thereof. The present application is a division of our copending application Ser. No. 686,926, filed August 26, 1933, which is now Patent 2,148,447.

Sewage consists of a mixture of water, minerals and other inert inorganic materials and organic materials either in suspension or solution and garbage and rubbish are similar in that they usually include mixtures of organic and inorganic material and water. The problem of sewage disposal involves the separation of the water from the more or less solid ingredients and the disposition of these solid ingredients in an economical manner without creating a nuisance in the region where the operation is carried on. All presently known methods for the purification and treatment of sewage and the disposal of the waste products of such methods consist of separating more or less perfectly the water from the other materials contained in the sewage after which the water is ordinarily run off to open streams or bodies of water and the other separated materials are disposed of in various ways. These waste materials, commonly known as sludge, screenings and grit, consist of the inorganic and organic ingredients of the sewage together with some water which has not been separated by the initial treatment. The organic materials consist mainly of vegetable and animal matter, including a large percentage of volatile and combustible material, while the inorganic materials are largely in the form of inert minerals. These more or less solid ingredients of the sewage are ordinarily disposed of either by mechanical dewatering and processing into fertilizer for which the market is limited, or by digestion followed by partial dewatering carried on in drying beds and again followed by dumping on waste land, or by partial digestion and evaporation in lagoons, or by dumping the material at sea or in open rivers and lakes. Where the sewage wastes are disposed of in lagoons or on drying beds, the disposal is usually uncertain, seasonal and intermittent, being dependent upon weather conditions and requiring the storage of the sewage waste for long periods before it can be spread out on the drying beds for the evaporation of the water carried therein. In addition, these methods of disposal of the organic and inorganic ingredients of the sewage waste do not reduce the materials to an inert form and are unsanitary and give rise to the possibility of undesirable odors and nuisances over large areas. None of these methods fully utilizes the combustible properties or contents found in all sewage waste materials, and which are found in the waste materials in sufficient quantity to make them practically capable of supporting combustion without the addition of any appreciable quantities of supplementary fuel when incinerated by the methods described in the following specification.

In our copending application above referred to, in which the present invention is broadly claimed, there is disclosed a method and several forms of apparatus by which sewage waste and the like is disposed of in a continuous process by drying the waste material and then burning it, the hot gases of combustion being utilized to effect the drying of further wet material, and the offensive odors given off by the material being also preferably destroyed by burning the gases or subjecting them to high temperature treatment, thus leaving the inert ash as the only solid residue of the process. By the practice of that invention and that of the present application, the waste material which may contain a relatively large percentage of moisture is subjected to a dewatering step and the remaining wet solid material, termed "filter cake" in the case of sewage waste, is then reduced to a finely divided state and subjected while in motion to the action of a hot drying medium, such as heated air or hot gases of combustion, thereby producing a continuous supply of dried material which is incinerated in a closed chamber thereby producing hot gases of combustion which are utilized for supplying heat in the drying stage. A portion of the dried material, produced in the drying stage, is preferably returned and mixed with the incoming wet material, in advance of that stage, in order to reduce the proportionate moisture content of the mixture.

More particularly, the present invention relates to an embodiment of the improved process and apparatus referred to above wherein the drying step is carried on in a rotary drying drum equipped, preferably, with means for lifting and dropping the material as the drum rotates so that the materials to be dried are thoroughly agitated and subjected to the action of hot gases or hot air to effect a thorough drying thereof, a portion of the dried material discharged from the drum being preferably returned to mix with the incoming wet material while the remainder of the dried material is conveyed to a furnace to be burned. In the form of the invention illustrated, the furnace communicates with a housing which surrounds the drum to form a combustion space around the periphery thereof, so that hot gases of combustion may pass through apertures in the drum into the interior thereof to mingle with the materials being dried while at the same time subjecting said materials to the action of radiant heat emitted by the heated walls of the combustion space and the heated portion of the drum enclosed therein. Other features and objects of the invention will appear more fully hereinafter.

The nature of the invention will be understood from the following specification taken with the accompanying drawing in which the improved method is described in connection with the disclosure of one form of the improved apparatus by which the invention is carried out. In the drawing, Figure 1 shows a somewhat diagrammatic longitudinal vertical section through one form of apparatus embodying the present invention; and Fig. 2 shows a transverse section taken on the line 2—2 of Fig. 1.

In the drawing there is shown somewhat diagrammatically one type of apparatus adapted for use in carrying on the present invention. In this form, the sewage waste, in a semi-fluid condition containing a large percentage of water, is placed in the tank of a separator, such as a rotary vacuum filter 580, comprising the tank 580$^a$ and the rotary drum 580$^b$ provided with an annular screen surface against which the solid material in the waste is caused to adhere by suction applied to the different chambers of the drum through the pipes 580$^c$. The fluid pressure applied through a pipe 580$^d$ assists the scraper 580$^e$ in removing the wet solid material and depositing it in a hopper 581 from which it passes downwardly by gravity through a conduit 582 and then drops into the hopper 583 of a rotary screw conveyor 584 driven by a motor 585. If desired, dried waste material from a hopper 586 may be passed into the hopper 583 through a conduit 587 and mixed with the wet material therein. The dried waste material is received over a belt conveyor 588 from a succeeding stage of the process, as hereinafter described, and the major portion of this dried material normally passes downwardly through a conduit 589 into the furnace. The conduit 587 which is adapted to discharge a portion of the dried material into the hopper 583 may be regulated or closed entirely by a damper 590. Provision is also made for mixing coal or other fuel with the waste material in the hopper 583 and for this purpose there is provided a fuel hopper or reservoir 591 having a conduit 592 adapted to discharge into the hopper 583 and another conduit 593 adapted to discharge into the furnace, as hereinafter explained.

The waste material is fed by the rotary screw conveyor 584 into the upper end of a rotary drier or kiln 595 which has its longitudinal axis inclined at a suitable angle, such as fifteen degrees, so that the material fed into the upper end thereof tends to move downwardly by gravity toward the lower discharge end of the drier. The upper end of the rotary drier is enclosed in a gas-collecting housing 596 and the lower end revolves in a housing 597 into which the solid material is discharged after it is dried. This drier is provided with a ring gear 598 arranged to mesh with a pinion 599 driven by a motor 600 so that the drier may be revolved at a suitable speed during its operation. On its inner surface, the rotary drier is provided with a plurality of longitudinally extending blades or vanes 601 which are adapted to pick up the material during the rotation of the drier and to drop it downwardly again so that it is thoroughly agitated and exposed to the action of the hot gasses in the drier as it passes from one end of the drier to the other.

The drier 595 is provided with two axially located tubes 602 and 603 which are located in alignment with each other and which have their lower ends flared outwardly as shown at 602$^a$ and 603$^a$, respectively. The upper end of the lower tube 603 is located in proximity to the flared opening of the upper tube 602, thus providing an annular passage 604 through which gases may be discharged from the lower end of the upper tube. At the mouth of the lower tube 603, there is provided a damper 605 in the form of a flat disk which may be adjusted longitudinally of the tube for the purpose of varying the annular discharge opening 606 around the edge of the damper. The damper is controlled by a rod 607 connected to a lever 608 which is provided on the end of the casing 597. This lever may be secured in adjusted position on a bracket 609, thus holding the damper 605 in any desired position. The upper tube 602 is closed at its upper end by an end wall 602$^b$ and it is provided around its periphery with three series of openings 602$^c$ which communicate with radially extending tubes 610 having their outer ends opening through the wall of the drier 595 within a gas chamber 611 formed by a housing 612. The gas chamber 611 is adapted to receive the hot gases of combustion which pass inwardly through the tubes 610 into the tube 602 from which they pass downwardly and are discharged into the chamber of the drier partially through the annular opening 604 and partially through the opening 606. After being thus discharged into the chamber of the drier, the gases pass upwardly through the drier into the gas-collecting housing 596 from which they are drawn off, as hereinafter described.

The passage of the hot gases of combustion through the rotary drier and its tubes brings about a thorough heating and drying of the waste material by reason of the direct mingling of the agitated material with the gases and also by reason of the contact of this material with the hot walls of the tubes and of the drier. It is then discharged in a thoroughly dried condition into the housing 597 at the lower end of the drier and falls by gravity through the opening 597$^a$ at the bottom of this housing onto the previously described belt conveyor 588 by which it is carried upwardly and deposited in the hopper 586. As heretofore explained, the dried material, or a major portion of it, then passes downwardly through the conduit 589 and it is discharged by this conduit into the hopper 615 which is also adapted to receive any fuel which may be supplied through the conduit 593. The hopper 615 discharges the dried material, and the fuel, if any, onto the grate 616 of a furnace 617. Air for combustion is supplied beneath the grate through a conduit 618 which receives the air from a fan 619 driven by a motor 620, the fan having an intake conduit 621 communicating with the atmosphere. The dried material which is thus continuously supplied to the furnace is burned continuously on the grate 616, the ash being discharged from the grate into the pit 622 while the hot gases of combustion pass upwardly through ports 623 into the gas chamber 611 previously referred to. After passing from the chamber 611 of the drier 595 and effecting the drying of the waste material, the gases are collected in the housing 596 and are exhausted through a conduit 624 leading to a fan 625 which is driven by a motor 626. The gases are discharged by the fan through a conduit 627 and may be wasted to the atmosphere or to a stack through a conduit 628 controlled by a damper 629 or they may be passed through a conduit 630 leading to a gas scrubber 631 which comprises a tower 632 through which the gases pass downwardly and are sprayed by jets of cold water from the nozzles 633 connected to the water supply through a pipe 634. From the bottom of the tower, the gases pass horizontally through a casing 635 having mounted therein a series of vertical partitions 636 provided with ports 637 through which the gas must pass and in which the gas is further cleaned and freed of objectionable odors by water jets projected through the ports from nozzles 638. The gas then passes upwardly through a conduit or stack 639 and may be liberated to the atmosphere. If desired, a heat treating device 640 may be connected in parallel with the scrubber 631. A conduit 641, controlled by a damper 642, leads from the conduit to the heat treating device and another conduit 643 leads from that device to the stack 639. A burner 644 projects a gas flame or the like into the casing of the device so that the gases are compelled to pass through the flame and are thereby deprived of their obnoxious characteristics. The device 640 may be shut off by the damper 642 and another damper 646 may be employed to prevent the flow of gases to the scrubber when the device 640 is in use. In this way, a compact and simplified form of apparatus may be employed for incinerating the waste material and destroying the objectionable gases without the utilization of the heat of combustion for drying the wet waste material before it reaches the rotary drier and without any comminution of the material other than that which is brought about by the rotary conveyor 584.

The form of apparatus herein described may be employed for disposing of sewage waste, garbage and other forms of waste, either separately or as mixtures of different forms of waste, and it is intended that the appended claims be so construed even though only one kind of waste is specified. Where reference is made in the claims to the burning of the gases given off by or separated from the waste material, it is, of course, only the combustible gases which are burned, the remaining non-combustible gases being merely subjected to a heat treatment to deprive them of their obnoxious character. Also, where reference is made to the separation of the solid material of the waste from the residue, it is to be understood that the solid material is ordinarily wet when separated so that drying is desirable before the burning stage of the process is reached.

Although one form of the improved apparatus of the present invention has been shown and described by way of illustration, it will be understood that the apparatus may be embodied in various other forms and that the improved method may be practiced in various ways coming within the scope of the appended claims.

We claim:

1. In apparatus for incinerating material of high moisture content, an inclined rotary drying drum, means for feeding material into said drum, means for rotating said drum, means in said drum for lifting and dropping the material as the drum rotates, a furnace, means for introducing gaseous products of combustion from said furnace into said drum to pass over and through the material, and means to receive the dried material from said drum and deliver part thereof to said feeding means to mix with raw material being fed into said drum and the remaining part of said dried material to said furnace to be burned.

2. In apparatus for incinerating material of high moisture content, an inclined rotary drying drum, means for rotating said drum, means for feeding material into said drum, means in said drum for lifting and dropping the material as the drum rotates, a housing enclosing a portion of said drum and forming a combustion space thereabout, a furnace positioned within said housing and communicating with said space, means for conducting gaseous products of combustion from said space into said drum to pass through and over the material therein, and means for receiving the dried material from said drum and for delivering part thereof to said feeding means to mix with raw material being fed into said drum and the remaining part of said dried material to said furnace to be burned.

3. The method of disposing of sewage and like waste material of high moisture content which consists in mixing partly dehydrated filter cake with previously dried material, drying the mixture by continuously lifting and dropping the mixed material while simultaneously subjecting it to direct action of radiant heat and also to the direct action of a current of hot gaseous products of combustion, returning a portion of the dried material to the mixing step, burning the remainder of the dried material, and utilizing the gaseous products of combustion thereof in the drying step.

4. The method of disposing of sewage and like waste material of high moisture content which comprises the operations of mixing the wet waste material with a quantity of previously dried material, continuously lifting and dropping the mixture of material while simultaneously subjecting it to the direct action of a current of hot gaseous products of combustion, burning a portion of the dried material, returning the remainder of the dried material to mix with the wet material in the first stage of the process, causing the hot gases of combustion thereof to mingle with said material while it is being lifted and dropped, removing the gases and vapors from said material, and subjecting said gases and vapors to a heat treating operation.

5. The combination in apparatus for disposing of sewage waste and the like, of a rotary drying kiln, means for separating the solid material from the residue of the sewage waste, mixing wet solid material with a quantity of previously dried material, delivering said mixture of material to said kiln, means for rotating said kiln and advancing said material therethrough, means for causing a flow of hot gases through said kiln during its rotation, means for exhausting the gases and vapors from said kiln, means for incinerating a portion of said material, means for returning the remainder of the dried material to be mixed with the incoming solid wet material, and means for heat treating said gases and vapors.

WILLIAM A. DUNDAS.
PHILIP HARRINGTON.